(12) United States Patent
Brandenburg et al.

(10) Patent No.: US 10,417,724 B2
(45) Date of Patent: Sep. 17, 2019

(54) METHODS AND SYSTEMS FOR INVENTORY YIELD MANAGEMENT

(71) Applicant: MINDBODY, INC., San Luis Obispo, CA (US)

(72) Inventors: Chet I. Brandenburg, Pismo Beach, CA (US); Amaya Weddle, San Luis Obispo, CA (US); Matthew A. Whitehead, Los Osos, CA (US)

(73) Assignee: MINDBODY, INC., San Luis Obispo, CA (US)

( * ) Notice: Subject to any disclaimer, the term of this patent is extended or adjusted under 35 U.S.C. 154(b) by 228 days.

(21) Appl. No.: 15/080,014

(22) Filed: Mar. 24, 2016

(65) Prior Publication Data

US 2016/0283098 A1 Sep. 29, 2016

Related U.S. Application Data

(60) Provisional application No. 62/138,719, filed on Mar. 26, 2015.

(51) Int. Cl.
*G06F 3/00* (2006.01)
*G06Q 50/20* (2012.01)
*G06Q 10/10* (2012.01)

(52) U.S. Cl.
CPC ....... *G06Q 50/205* (2013.01); *G06Q 10/1057* (2013.01)

(58) Field of Classification Search
CPC .................................................. G06F 3/04847
USPC .................................................. 715/738, 739
See application file for complete search history.

(56) References Cited

U.S. PATENT DOCUMENTS

2013/0339374 A1* 12/2013 Skeen ............... G06F 17/30029
707/754

\* cited by examiner

*Primary Examiner* — Andrey Belousov
(74) *Attorney, Agent, or Firm* — Schwegman Lundberg & Woessner, P.A.

(57) ABSTRACT

In some embodiments, an interactive user interface is provided for an inventory yield management system having access to an inventory database and a class database. The system comprises at least one processor to implement a single interactive user interface comprising a first user interface element configured to present a first user interface view to receive a selection of data stored in the inventory database; a second user interface element configured to present a second user interface view to receive a selection of data for creating a configurable class pass for one or more classes stored in the class database; and a channel indicator for associating a configured class pass with a channel of classes.

15 Claims, 5 Drawing Sheets

METHODS AND SYSTEMS FOR INVENTORY YIELD MANAGEMENT

CROSS-REFERENCE TO RELATED APPLICATIONS

This application claims the benefit of priority, under 35 U.S.C. Section 119(e), of U.S. Patent Application Ser. No. 62/138,719, entitled METHODS AND SYSTEMS FOR INVENTORY YIELD MANAGEMENT, inventor Chet I. Brandenburg, filed on Mar. 26, 2015, which is herein incorporated by reference in its entirety.

BACKGROUND

Employers sometimes provide their employees with rewards or bonuses as part of a comprehensive benefits package and to encourage desirable behavior. Part of a benefits package can include medical benefits, for example membership with a medical insurance provider and support in paying premiums. Employee medical costs can have a significant effect on corporate finances. Tracking employee attendance wellness classes and ensuring the credibility and reliability of data is important for incentive schemes and the equitable and efficient operation of a wellness program. Class inventory yield management can be important for all participants in the wellness area, both in terms of using technology to drive down costs and improve efficiency and engagement. Across a vast population of potential participants, significant technological problems can arise.

BRIEF SUMMARY

In some embodiments, an interactive user interface for an inventory yield management system having access to an inventory database and a class database may include at least one processor to implement a single interactive user interface, a first user interface element configured to present a first user interface view to receive a selection of data stored in the inventory database, a second user interface element configured to present a second user interface view to receive a selection of data for creating a configurable class pass for one or more classes stored in the class database, and/or a channel indicator for associating a configured class pass with a channel of classes.

In some embodiments, the single interactive user interface may further include a third user interface element configured to present a third user interface view to receive a class space designation.

In some embodiments, the single interactive user interface may further include a fourth user interface element configured to present a fourth user interface view to receive a class discount designation.

In some embodiments, the single interactive user interface may further include a fifth user interface element configured to present a fifth user interface view to receive a class time selection.

In some embodiments, the at least one processor is further to calculate a projected yield of the one or more classes associated with the configured class pass.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
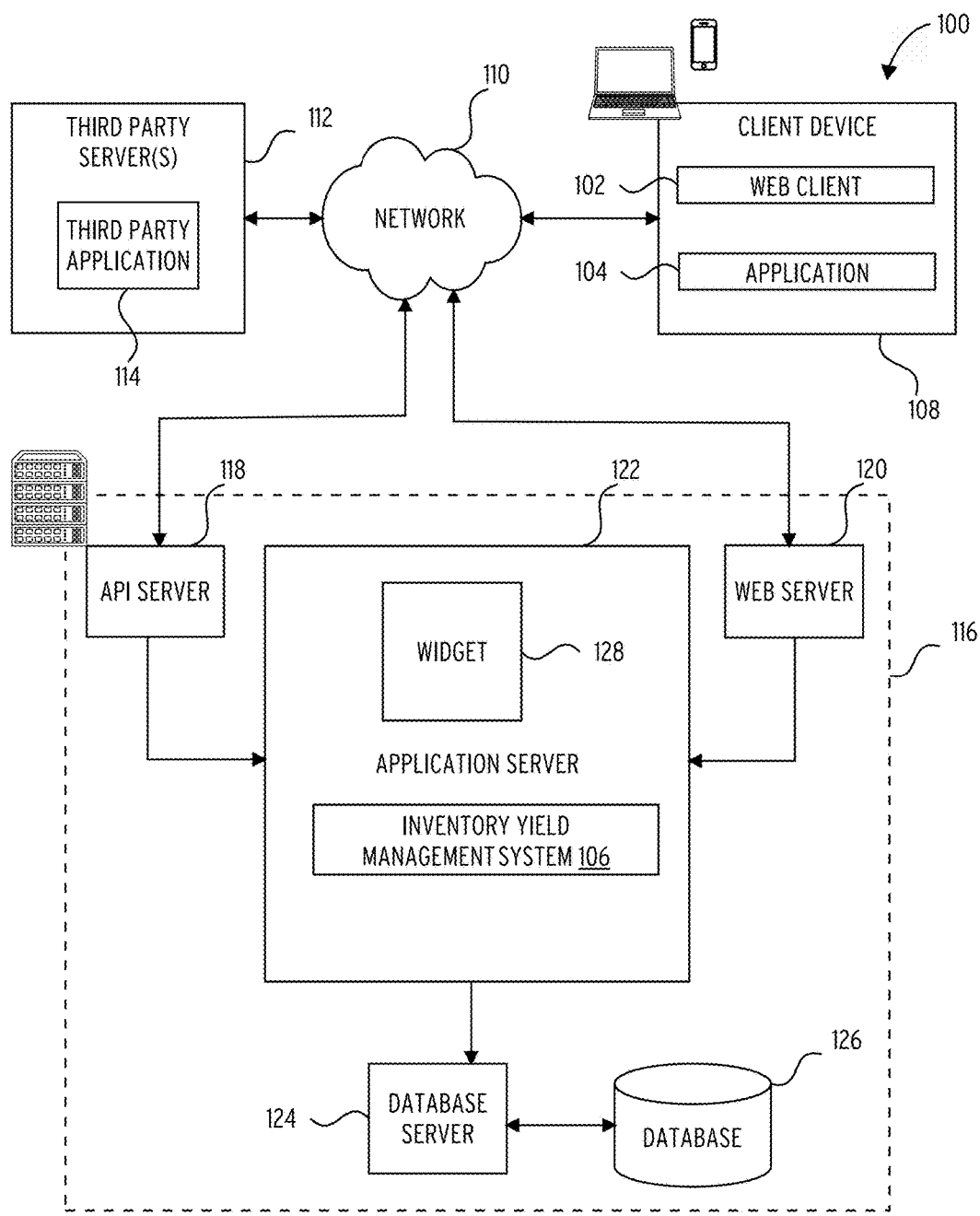
FIG. 1 is a block diagram illustrating a networked system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. ?A processor ma, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, MINDBODY, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts an inventory yield management system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts an inventory yield management system 106, which includes modules or applications. The application server 122 is, in turn, shown to be coupled to a database server 124 that facilitates access to information storage repositories (e.g., a database 126). In an example embodiment, the database 126 includes storage devices that store information accessed and generated by the inventory yield management system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., inventory yield management system 106) via the web interface supported by the web server 120. Similarly, the application 104 (e.g., an "app") accesses the various services and functions provided by the inventory yield management system 106 via the programmatic interface provided by the Application Program Interface (API) server 118. The application 104 may, for example, an "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The inventory yield management system 106 could also be implemented as a standalone software program, which do not necessarily have networking capabilities.

Figure 2:
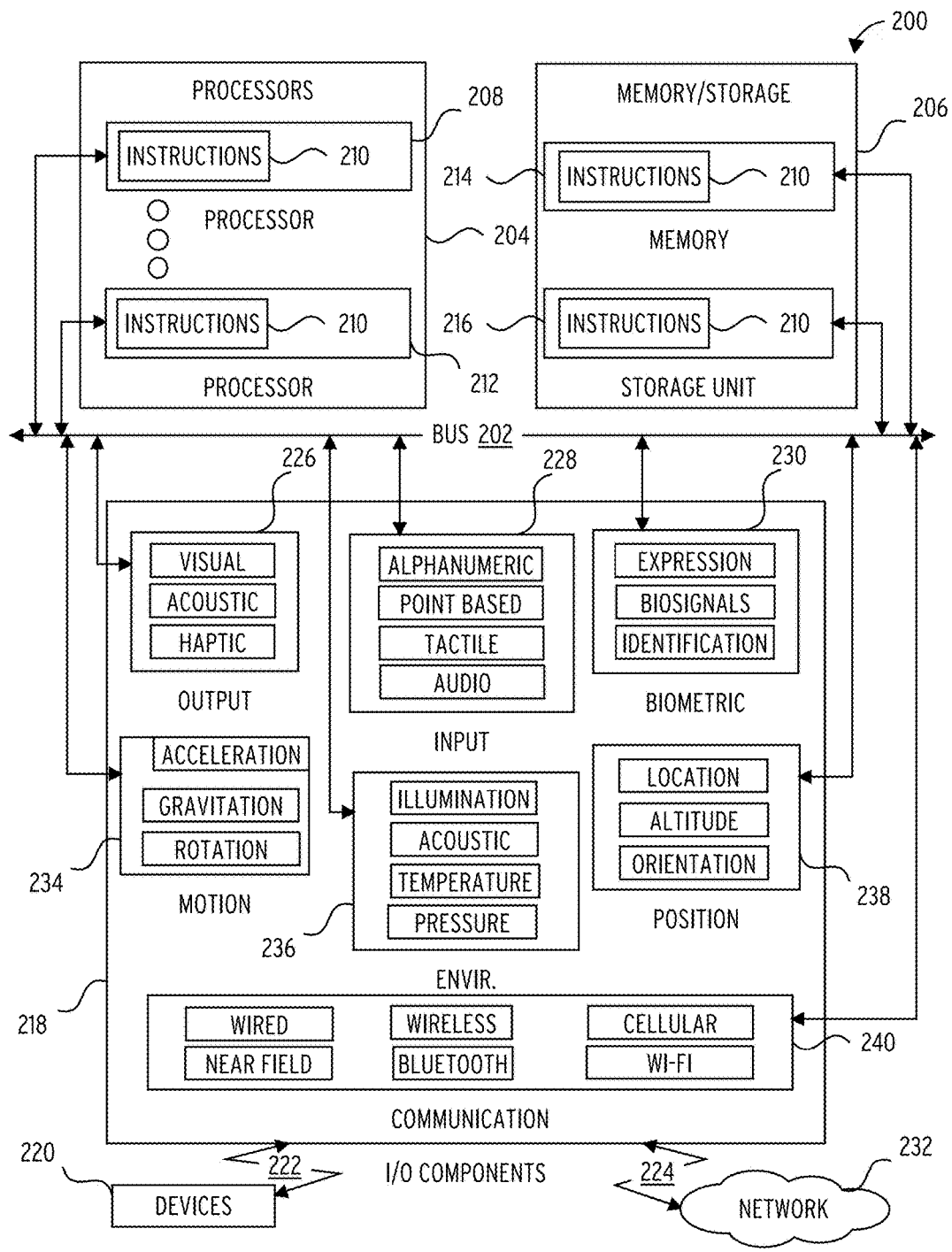
FIG. 2 is a block diagram illustrating components of a machine, according to some example embodiments, able to read instructions from a machine-readable medium (e.g., a machine-readable storage medium) and perform any one or more of the methodologies discussed herein.

FIG. 2 is a block diagram illustrating components of a machine 200, according to some example embodiments, able to read instructions from a machine-readable medium (e.g., a machine-readable storage medium) and perform any one or more of the methodologies discussed herein. Specifically, FIG. 2 shows a diagrammatic representation of the machine 200 in the example form of a computer system, within which instructions 210 (e.g., software, a program, an application, an applet, an app, or other executable code) for causing the machine 200 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 200 operates as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 210, sequentially or otherwise, that specify actions to be taken by machine 200. Further, while only a single machine 200 is illustrated, the term "machine" shall also be taken to include a collection of machines that individually or jointly execute the instructions 210 to perform any one or more of the methodologies discussed herein.

The machine 200 may include processors 204, memory memory/storage 206, and I/O components 218, which may be configured to communicate with each other such as via a bus 202. The memory/storage 206 may include a memory 214, such as a main memory, or other memory storage, and a storage unit 216, both accessible to the processors 204 such as via the bus 202. The storage unit 216 and memory 214 store the instructions 210 embodying any one or more of the methodologies or functions described herein. The instructions 210 may also reside, completely or partially, within the memory 214, within the storage unit 216, within at least one of the processors 204 (e.g., within the processor's cache memory), or any suitable combination thereof, during execution thereof by the machine 200. Accordingly, the memory 214, the storage unit 216, and the memory of processors 204 are examples of machine-readable media.

The I/O components 218 may include a wide variety of components to receive input, provide output, produce output, transmit information, exchange information, capture measurements, and so on. The specific I/O components 218 that are included in a particular machine will depend on the type of machine. For example, portable machines such as mobile phones will likely include a touch input device or other such input mechanisms, while a headless server machine will likely not include such a touch input device. It will be appreciated that the I/O components 218 may include many other components that are not shown in FIG. 2. The I/O components 218 are grouped according to functionality merely for simplifying the following discussion and the grouping is in no way limiting. In various example embodiments, the I/O components 218 may include output components output components 226 and input components 228. The output components 226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 218 may include biometric components 230, motion components 234, environmental environment components 236, or position components 238 among a wide array of other components. For example, the biometric components 230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 234 may include acceleration sensor components (e.g., accelerometer), gravitation sensor components, rotation sensor components (e.g., gyroscope), and so forth. The environment components 236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 238 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 218 may include communication components 240 operable to couple the machine 200 to a network 232 or devices 220 via coupling 222 and coupling 224 respectively. For example, the communication components 240 may include a network interface component or other suitable device to interface with the network 232. In further examples, communication components 240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 220 may be another machine or any of a wide variety of peripheral devices (e.g., a peripheral device coupled via a Universal Serial Bus (USB)).

Moreover, the communication components 240 may detect identifiers or include components operable to detect identifiers. For example, the communication components processors communication components 240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 240, such as, location via Internet Protocol (IP) geo-location, location via Wi-Fi® signal triangulation, location via detecting a NFC beacon signal that may indicate a particular location, and so forth.

Figure 3:
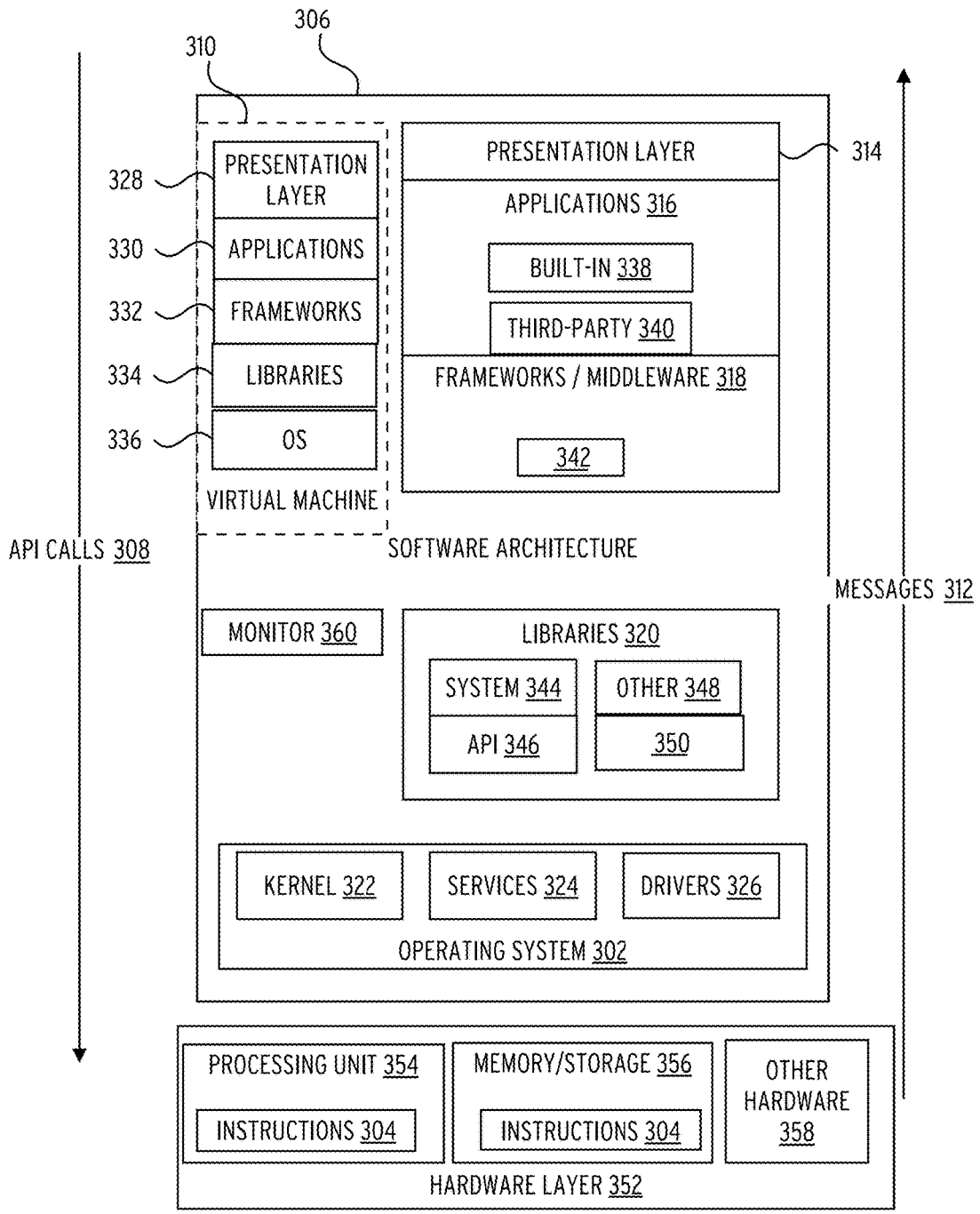
FIG. 3 is a block diagram illustrating a representative software architecture software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture and it will be appreciated that many other architectures may be implemented to facilitate the functionality described herein. The software architecture 306 may execute on hardware such as machine 200 of FIG. 2 that includes, among other things, processors 204, memory 214, and I/O components 218. A representative hardware layer 352 is illustrated and can represent, for example, the machine 200 of FIG. 2. The representative hardware layer 352 includes a processing unit 354 having associated executable instructions 304. Executable instructions 304 represent the executable instructions of the software architecture 306, including implementation of the methods, modules and so forth described herein. The hardware layer 352 also includes memory and/or storage modules memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324 and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as operating system 302) to facilitate functionality described herein.

The applications 316 may use built in operating system functions (e.g., kernel 322, services 324 and/or drivers 326), libraries 320, and frameworks/middleware 318 to create user interfaces to interact with users of the system. Alternatively, or additionally, in some systems interactions with a user may occur through a presentation layer, such as presentation layer 314. In these systems, the application/module "logic" can be separated from the aspects of the application/module that interact with a user.

Some software architectures use virtual machines. In the example of FIG. 3, this is illustrated by a virtual machine 310. The virtual machine 310 creates a software environment where applications/modules can execute as if they were executing on a hardware machine (such as the machine 200 of FIG. 2, for example). The virtual machine 310 is hosted by a host operating system (operating system (OS) 336 in FIG. 3) and typically, although not always, has a virtual machine monitor 360, which manages the operation of the virtual machine as well as the interface with the host operating system (i.e., operating system 302). A software architecture executes within the virtual machine 310 such as an operating system operating system (OS) 336, libraries 334, frameworks 332, applications 330 and/or presentation layer 328. These layers of software architecture executing within the virtual machine 310 can be the same as corresponding layers previously described or may be different.

Figure 4:
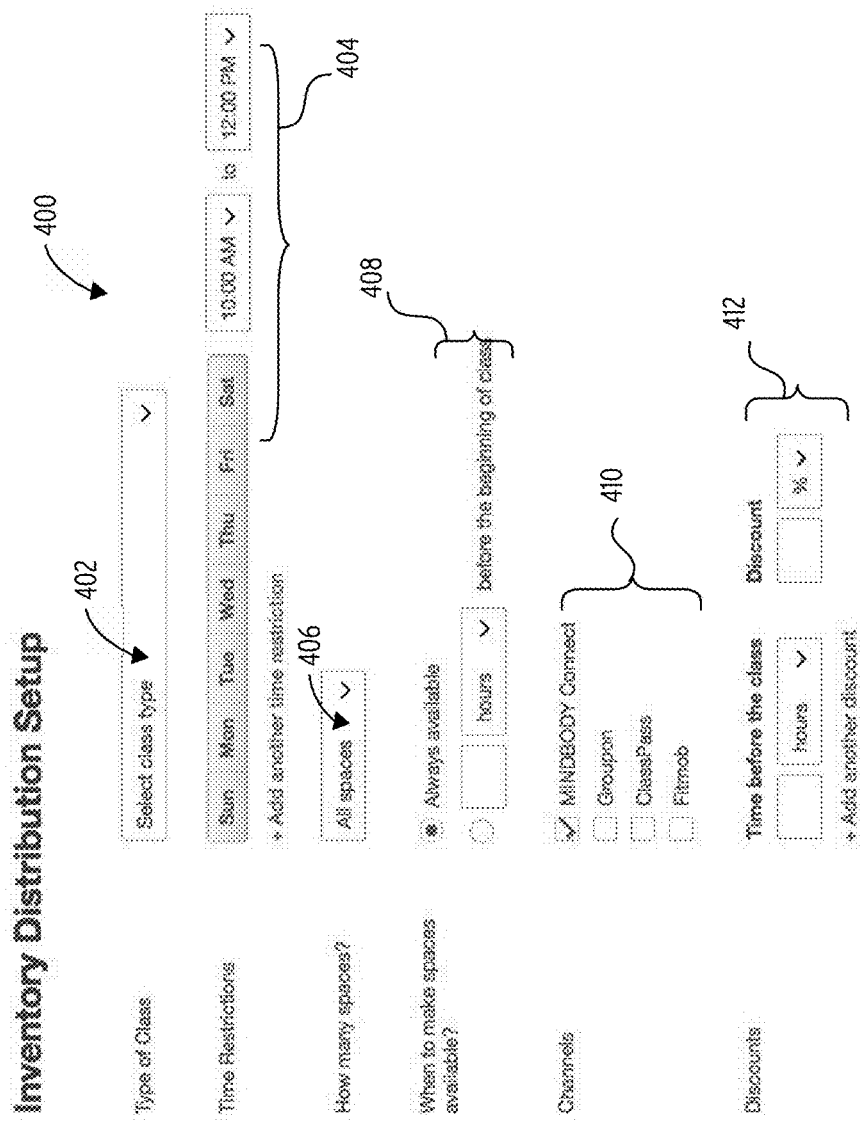
FIG. 4 shows a graphical user interface for an inventory yield management or class pass tool, according to an example embodiment.

Reference is now made to FIG. 4 which illustrates a graphical user interface (GUI) 400 for an inventory yield management or class pass tool, according to an example embodiment. The tool and GUI can be enabled by the inventory yield management system 106 (FIG. 1). In this case, the inventory relates to available wellness classes and related services and features. Other inventory types are possible.

In some examples, the yield management or class pass tool is provided in an application ("app") which can be downloaded to a smart device such as a portable electronic device, wearable device, smart watch, PDA, as shown for example by client device 108 in FIG. 1.

In the descriptions that follow, reference is variously made to a "user". This term is intended to be a reference (without limitation) to a wellness provider (or, for example, a human operator or receptionist employee utilizing the tool), an employer such as a corporation or, for example, an HR administrator utilizing the tool, a consumer of wellness services (for example, a company, an individual or other entity), and a health insurance company or, for example, an insurance agent employee utilizing the tool. Other users are possible.

In the following description, the example GUI's are touch sensitive. They need not be. In the present examples, slide-based or touch-based user navigation actions such as "swipes", "scrolls" and "taps" can cause the performance of operations within a processor or machine, such as the inventory yield management system 106 or client device 108, with which the GUI is associated or connected locally or remotely. Other GUI's with clickable links or scrolling bars, for example, are possible.

The ability for a user (e.g. a wellness provider, or an employer) to maximize yield from an inventory of wellness classes can be important for a number of reasons discussed in the background of the invention given further above. The yield management described herein can relate to aspects such as class attendance levels, cost reduction, profit maximization, and other factors. In one aspect of the present disclosure, a central or wellness provider "hub" creates and supplies data and recommendations to other associated or satellite wellness providers for managing inventory yield. The data and recommendations are created by performing technical analysis and modelling factors such as optimized class start times, class types and availability channels, group passes, incentives, discounts, instructor availability, class participation levels and class spaces. Other factors are possible. In some examples, an inventory yield management service or class pass booking scheme hosted by the wellness provider hub can be subscribed to, or downloaded via the app.

As an example in this regard, the GUI 400 in FIG. 4 shows an interactive display for a yield management or class pass tool. At interface element 402, a class type for generation of a class pass (or inventory yield management recommendation) can be selected. At interface elements 404, a time restriction can be applied. The interface element 406 allows a number of class spaces forming the subject of a generated class pass (or yield management recommendation) to be selected. The availability of the selected spaces can be tailored using interface elements 408. Example communication channels by which the wellness classes can be subscribed to, viewed or booked are listed in interface elements 410. Variable discounts that can be applied to a class pass, or which may be recommended to optimize or manage inventory yield, are selected or provided in interface elements 412. Any one or more of the data elements selectable by the interface elements shown in the GUI 400 can be tailored to create a class pass which will optimize class inventory yield.

Using the class pass tool above, a user such as an employer (e.g. large corporation), a wellness software provider (e.g. MindBody Inc. or FitMob), wellness provider (e.g. yoga studio), can create a "multi-business", "multi-region" or "multi-class" pass or an individual user or consumer. Many other combinations and use cases are possible. As further examples, wellness packages for example can be created using such class passes to encourage attendance at wellness classes, or incentivize use of wellness services in general.

At the same time, or even independently, the potential yield (i.e. returns, or profit) from an inventory of classes or service providers can be more easily identified, predicted and optimized. For example, in order to generate a certain yield, or define a certain employee medical benefit at a defined cost, a "class pass" may be created and conveniently provided in an app to allow (as just one example) employee Smith, employed at the Orange Corporation, to attend one or more yoga classes (i.e. multi-time) at studios A, B and C (i.e. multi-business) in December 2015 (i.e. defined period), within the region of zip codes 12345 and 67891 (i.e. multi-region). It will be appreciated that many combinations and permutations of class pass, including "multi"-aspect functionality, can conveniently be created using the yield management and class pass tools described herein.

Figure 5:
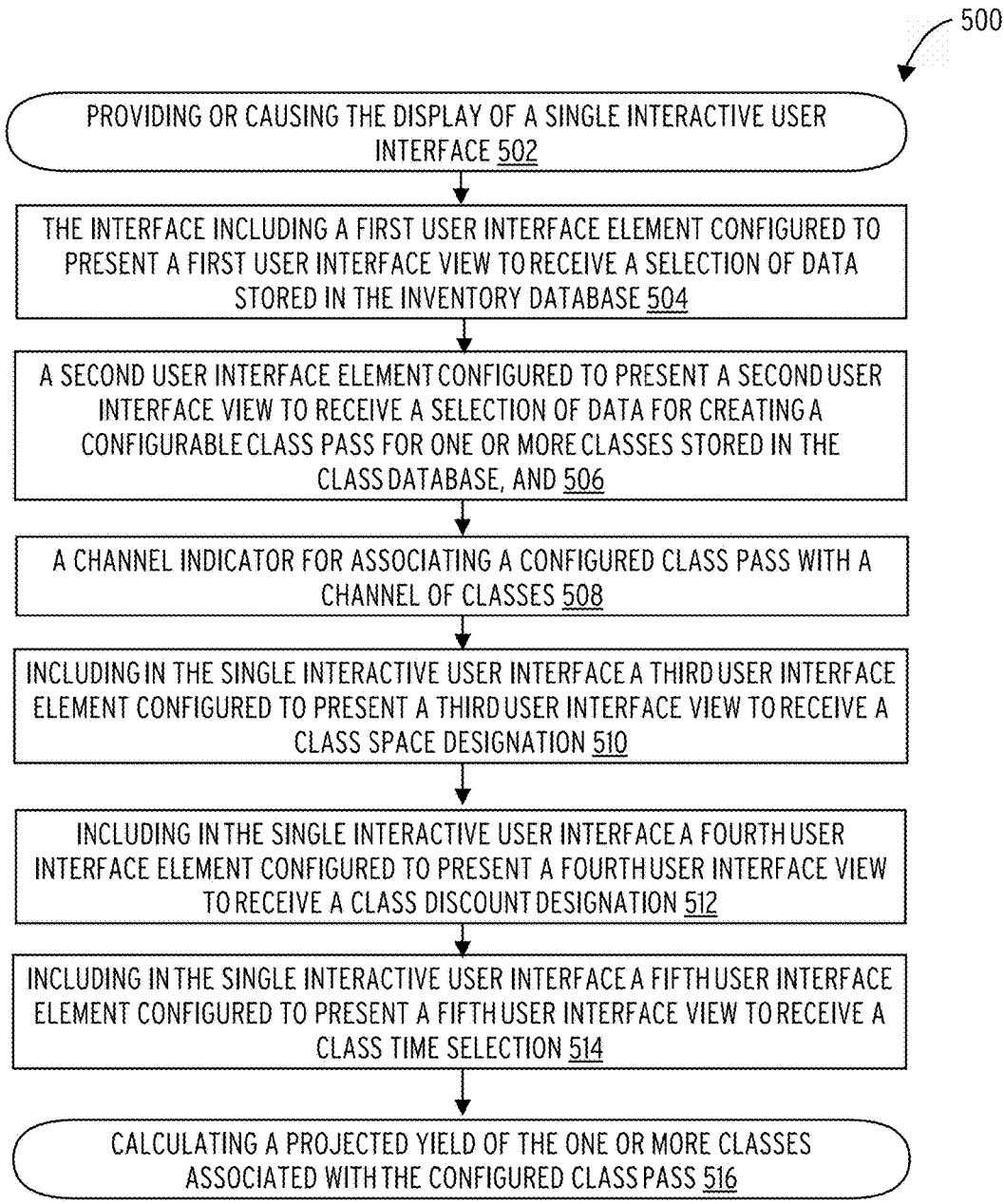
FIG. 5 illustrates a flow diagram of a method of managing the yield of an inventory, in accordance with one embodiment.

Some embodiments of the present inventive subject matter include methods for aspects of patent management. A flow diagram for one such embodiment is illustrated in FIG. 5. A computer-implemented method 500 of managing the yield of an inventory, at an inventory yield management system having access to an inventory database and a class database, may comprise, at 502, providing or causing the display of a single interactive user interface comprising; at 504, a first user interface element configured to present a first user interface view to receive a selection of data stored in the inventory database; at 506, a second user interface element configured to present a second user interface view to receive a selection of data for creating a configurable class pass for one or more classes stored in the class database; and, at 508, a channel indicator for associating a configured class pass with a channel of classes.

In some embodiments, the method 500 may further comprise, at 510, including in the single interactive user interface a third user interface element configured to present a third user interface view to receive a class space designation.

In some embodiments, the method 500 may further comprise, at 512, including in the single interactive user interface a fourth user interface element configured to present a fourth user interface view to receive a class discount designation.

In some embodiments, the method 500 may further comprise, at 514, including in the single interactive user interface a fifth user interface element configured to present a fifth user interface view to receive a class time selection.

In some embodiments, the method 500 may further comprise, at 516, calculating a projected yield of the one or more classes associated with the configured class pass.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Description, with each claim standing on its own as a separate embodiment.

What is claimed is:

1. An inventory yield management system having access to an inventory database and a class database, the system comprising:
   at least one processor of a machine; and
   a memory storing instructions that, when executed by the at least one processor, cause the machine to perform operations to improve an interactive user interface for the inventory yield management system by displaying projected yield comprising, at least:
      generating the interactive user interface, wherein the interactive user interface includes:
      a first user interface element configured to present a first user interface view to receive a selection of data stored in the inventory database, and
      a second user interface element configured to present a second user interface view to receive a selection of data for creating a configurable class pass for one or more classes stored in the class database,
         causing a display of the interactive user interface on a display device of a client device,
         generating a configured class pass based on the received selection of data for creating the configurable class pass,
         associating the configured class pass with the one or more classes stored in the class database, and generating, for display in the interactive user interface, recommendations for managing inventory yield, the recommendations based on one or more optimization factors selected from the group of optimization factors comprising: a class start time, a class type, an availability channel, a group pass, an incentive, a discount, an instructor availability, a class participation level, and a class space;
      identifying a projected yield of the one or more classes associated with the configured class pass, wherein the projected yield includes an optimized profit for the one or more classes stored in the class database; and
      causing a display of the projected yield of the one or more classes associated with the configured pass on a user interface on the display device of the client device.

2. The interactive user interface of claim 1, wherein the single interactive user interface further comprises a third user interface element configured to present a third user interface view to receive a class space designation.

3. The interactive user interface of claim 1, wherein the single interactive user interface further comprises a fourth user interface element configured to present a fourth user interface view to receive a class discount designation.

4. The interactive user interface of claim 1, wherein the single interactive user interface further comprises a fifth user interface element configured to present a fifth user interface view to receive a class time selection.

5. The interactive user interface of claim 1, wherein the projected yield relates to class attendance.

6. A computer-implemented method of improving an interactive user interface for an inventory yield management system by displaying projected yield of an inventory, the inventory yield management system having access to an inventory database and a class database, the method comprising:
   generating the interactive user interface, wherein the interactive user interface includes:
      a first user interface element configured to present a first user interface view to receive a selection of data stored in the inventory database, and
      a second user interface element configured to present a second user interface view to receive a selection of data for creating a configurable class pass for one or more classes stored in the class database,
   causing a display of interactive user interface on a display device of a client device,
      generating a configured class pass based on the received selection of data for creating the configurable class pass,
      associating the configured class pass with a channel of the one or more classes stored in the class database, and generating, for display in the interactive user interface, recommendations for managing inventory yield, the recommendations based on one or more optimization factors selected from the group of optimization factors comprising: a class start time, a class type, an availability channel, a group pass, an incentive, a discount, an instructor availability, a class participation level, and a class space;
   identifying a projected yield of the one or more classes associated with the configured class pass, wherein the projected yield includes at least one of: cost reduction or profit maximization an optimized profit for the one or more classes stored in the class database; and causing a display of the projected yield of the one or more classes associated with the configured pass on a user interface on the display device of the client device.

7. The method of claim 6, further comprising including in the single interactive user interface a third user interface element configured to present a third user interface view to receive a class space designation.

8. The method of claim 6, further comprising including in the single interactive user interface a fourth user interface element configured to present a fourth user interface view to receive a class discount designation.

9. The method of claim 6, further comprising including in the single interactive user interface a fifth user interface element configured to present a fifth user interface view to receive a class time selection.

10. The method of claim 6, wherein the projected yield relates to class attendance.

11. A non-transitory computer-readable storage medium, the computer-readable storage medium including instructions that when executed by a computer, cause the computer to perform operations to improve an interactive user interface for the inventory yield management system by displaying projected yield, the operations comprising at least:
generating the interactive user interface, wherein the interactive user interface includes:
a first user interface element configured to present a first user interface view to receive a selection of data stored in the inventory database, and
a second user interface element configured to present a second user interface view to receive a selection of data for creating a configurable class pass for one or more classes stored in the class database,
causing a display of the interactive user interface on a display device of a client device,
generating a configured class pass based on the received selection of data for creating the configurable class pass,
associating the configured class pass with the one or more classes stored in the class database, and generating, for display in the interactive user interface, recommendations for managing inventory yield, the recommendations based on one or more optimization factors selected from the group of optimization factors comprising: a class start time, a class type, an availability channel, a group pass, an incentive, a discount, an instructor availability, a class participation level, and a class space;
identifying a projected yield of the one or more classes associated with the configured class pass, wherein the projected yield includes an optimized profit for the one or more classes stored in the class database; and
causing a display of the projected yield of the one or more classes associated with the configured pass on a user interface on the display device of the client device.

12. The non-transitory computer-readable storage medium of claim 11, wherein the operations further comprise including in the single interactive user interface a third user interface element configured to present a third user interface view to receive a class space designation.

13. The non-transitory computer-readable storage medium of claim 11, wherein the operations further comprise including in the single interactive user interface a fourth user interface element configured to present a fourth user interface view to receive a class discount designation.

14. The non-transitory computer-readable storage medium of claim 11, wherein the operations further comprise including in the interactive user interface a fifth user interface element configured to present a fifth user interface view to receive a class time selection.

15. The non-transitory computer-readable storage medium of claim 11, wherein the projected yield relates to class attendance.

* * * * *